United States Patent
Mankame et al.

(10) Patent No.: US 10,471,870 B2
(45) Date of Patent: Nov. 12, 2019

(54) MULTI-ZONE SEAT SUSPENSION

(71) Applicant: GM Global Technology Operations LLC, Detroit, MI (US)

(72) Inventors: Nilesh D. Mankame, Ann Arbor, MI (US); Onkar S. Akolkar, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 113 days.

(21) Appl. No.: 15/727,155

(22) Filed: Oct. 6, 2017

(65) Prior Publication Data
US 2019/0106037 A1 Apr. 11, 2019

(51) Int. Cl.
*B60N 2/70* (2006.01)
*A47C 7/20* (2006.01)
*B60N 2/58* (2006.01)

(52) U.S. Cl.
CPC ............ *B60N 2/7035* (2013.01); *A47C 7/20* (2013.01); *B60N 2/58* (2013.01); *B60N 2/70* (2013.01); *B60N 2/7094* (2013.01)

(58) Field of Classification Search
CPC .......... B60N 2/7035; B60N 2/58; A47C 7/18; A47C 7/20
USPC ............................ 297/452.48, 452.63–452.65
See application file for complete search history.

(56) References Cited

U.S. PATENT DOCUMENTS

| | | | | |
|---|---|---|---|---|
| 5,927,427 A | * | 7/1999 | Sewell | B60N 2/002 180/273 |
| 6,056,079 A | * | 5/2000 | Cech | B60N 2/002 177/144 |
| 6,476,514 B1 | * | 11/2002 | Schondorf | B60R 21/01516 180/271 |
| 6,578,871 B2 | * | 6/2003 | Gray | B60R 21/01516 280/735 |
| 6,629,715 B2 | * | 10/2003 | Oh | B60N 2/0224 296/63 |
| 9,694,714 B2 | * | 7/2017 | Shin | B60N 2/002 |
| 2010/0223730 A1 | * | 9/2010 | Pearce | A47C 27/144 5/655.5 |
| 2010/0227091 A1 | * | 9/2010 | Pearce | A47C 27/056 428/36.1 |
| 2010/0300798 A1 | * | 12/2010 | Sereboff | G10K 11/165 181/175 |
| 2012/0299605 A1 | * | 11/2012 | Wakabayashi | H03K 17/955 324/679 |
| 2013/0214583 A1 | * | 8/2013 | Uramichi | B60N 2/70 297/452.48 |

(Continued)

*Primary Examiner* — Mark R Wendell
(74) *Attorney, Agent, or Firm* — Quinn IP Law (57) ABSTRACT

A suspension member for a seat assembly includes a plurality of zones which define spatially varying properties of the suspension member. Each of the zones produces a response to an occupant load imposed on the seat assembly by a seated occupant, where the response includes one or more of a stiffness response, an energy dissipation response, and a thermal response. The response produced by each zone is different from the response produced from any other of the zones. The suspension member can be made of a homogenous material or made of a combination of materials such that each zone is made of a different material. The suspension member can include a textile material formed by weaving, knitting or crocheting. At least one zone of the suspension member can include one or more apertures.

19 Claims, 4 Drawing Sheets

(56) References Cited

U.S. PATENT DOCUMENTS

| | | | |
|---|---|---|---|
| 2014/0246887 A1* | 9/2014 | Clos | B60N 2/002 |
| | | | 297/217.3 |
| 2015/0123436 A1* | 5/2015 | Boyer | B60N 2/646 |
| | | | 297/217.2 |
| 2015/0143927 A1* | 5/2015 | Goedert | B60N 2/7094 |
| | | | 73/862.641 |
| 2017/0079440 A1* | 3/2017 | Todd | B62J 1/007 |
| 2017/0080683 A1* | 3/2017 | Holbrook | B32B 27/40 |
| 2017/0240080 A1* | 8/2017 | Drbohlav | B60N 2/58 |
| 2017/0354261 A1* | 12/2017 | Tobata | A47C 27/14 |
| 2018/0271285 A1* | 9/2018 | Park | A47C 31/126 |
| 2018/0297490 A1* | 10/2018 | Murata | B29C 43/18 |

\* cited by examiner

MULTI-ZONE SEAT SUSPENSION

INTRODUCTION

The present disclosure relates to a seat suspension for a vehicle seat assembly. More specifically, the seat suspension has spatially varying mechanical properties for increasing the contact area of an occupant with the seat assembly surface and for dissipation of contact pressure over the contact area.

BACKGROUND

A seat assembly, such as a seat assembly for a vehicle, includes a generally upright seat back and a generally horizontal lower seat. Each of the seat back and the seat typically includes a frame, a suspension, a cushion, and a trim material. The trim material is used to cover the cushion, suspension and frame, and to provide an exterior surface for contact with an occupant of the seat assembly. The frame provides the support structure to attach the seat back and lower seat to each other and/or to the vehicle. The suspension is disposed between the cushion and the frame. The cushion is typically made from an expandable foam material and is molded to a predetermined shape as required by the shape of the seat back and of the lower seat. The configuration of the trim material, the cushion and the suspension, in combination, determine the contact area of an occupant seated in the seat assembly, and the pressure distribution of contact pressure experienced by the seated occupant. The comfort of the seated occupant is affected by the area and pattern of the occupant's contact with the lower seat and seat back surfaces, and by the maximum contact pressure and the pressure distribution of the contact pressure experienced by the seated occupant. The comfort of the seated occupant can further be affected by the thermal characteristics of the seat, including the thermal conductivity of, heat storage capacity of, and resistance to flow of fluid through the seat.

SUMMARY

A suspension member for a seat suspension of a seat assembly is described, where the suspension member is configured for installation in a seat assembly including a lower seat and a seat back. In one example, the seat assembly is a vehicle seat assembly for installation in a vehicle. In one example, a suspension member can be installed in each of the lower seat and the seat back, such that the suspension member provides a response to the occupant load exerted by a seated occupant on each of the lower seat and the seat back. Each of the lower seat and the seat back can include a frame, a suspension including a suspension member as described herein, a cushion and a trim material, where the suspension is disposed between the frame and the cushion, which is attached to the frame. The trim material provides a covering for the cushion, suspension and frame, and defines the contact surface which is in contact with an occupant seated in the seat assembly. As seated, the occupant exerts an occupant load on each of the seat back and the lower seat, and each of the seat back and the lower seat, via the combination of seat components, e.g., via the combination of the trim material, the cushion, the suspension, and the frame, provides a response to the occupant load and exerts a contact pressure on the occupant. The response can include a thermal response, a mechanical response, or a thermomechanical response. Examples of the types of responses which can be provided by the seat assembly, and by the suspension member of the seat assembly, include one or more of a stiffness response such as a deflection response, an energy dissipation response and a thermal response such as a diffusivity response, a conductivity response, a heat storage response, and a resistance to fluid flow. In one example, the stiffness response includes one or more of the seat components, such as the suspension member, being deformed in response to the occupant load such that the contact surface of the vehicle seat conforms to the seated occupant to define a contact area between the occupant and the contact surface. In one example, the dissipation response can include damping one or more inputs transmitted to the seat assembly, such as vibration or input from a surface in contact with the seat assembly such as a floor surface, or in the example of a vehicle seat, vibration, noise, road feel, etc., which can be transmitted to the seat assembly via the vehicle structure to which the vehicle seat assembly is attached. In one example, the diffusivity response can include diffusing thermally conditioned air and/or moisture through the suspension member.

The suspension member described herein includes a plurality of zones which define spatially varying mechanical properties of the suspension member. Each of the zones produces a response to an occupant load imposed on the seat assembly by the seated occupant, where the response includes one or more of a stiffness response, an energy dissipation response, and a thermal response. The response produced by each zone is different from the response produced from any other of the zones of the suspension member. In one example, the combination of responses provided by the suspension member in response to the occupant load includes a stiffness response and an energy dissipation response which combine to increase the contact area of the seated occupant with the seat contact surface, and thus reduce the maximum contact pressure over the contact area, where the contact pressure is generated in response to the occupant load imposed on the seat by the seated occupant. In one example, the suspension member can be made of a homogeneous material, where the term "homogeneous material" as used herein, refers to a material which is uniform and structure and composition throughout, such as a polymer-based material which may be a molded material, an elastomeric material, a solid metal-based material, etc. One or more apertures can be formed in the suspension member to define a zone. In one example, the suspension member can be made of a combination of materials such that at least one zone of the suspension is made of different material than at least one other zone of the suspension member. In one example, the suspension member is made only of non-metallic materials. In one example, the suspension includes a textile material, where the term "textile material" as used herein, refers to a material which is formed by weaving, knitting, crocheting, braiding or a combination of these. The textile material can include one or more of organic fibers such as animal and/or plant based fibers, synthetic fibers including polymeric and/or glass-based fibers, and/or metal-based fibers. The suspension member having spatially varying mechanical properties and described herein includes a first zone configured to provide a first response to the occupant load and a second zone configured to provide a second response to the occupant load, where the first response is different than the second response. Each of the first and second responses can include at least one of a stiffness response, an energy dissipation response, and a thermal response.

In one example, the first zone is characterized by a first elastic modulus, the second zone is characterized by a second elastic modulus, and the first elastic modulus is different than the second elastic modulus. In one example, the first zone is made of a first material and the second zone is made of a second material. The first and second materials can be one of a homogeneous material such as an organic, polymeric, elastomeric or metal-based material, a textile material which can include one or more of an organic fiber such as an animal fiber or plant-based fiber, a synthetic fiber, a ceramic-based fiber such as a glass fiber, a carbon fiber, and metal-based fiber. In another example, the suspension member can be made of a single type of material such that the first and second zones are differentiated from each other by shape, size, thickness, density, pattern, the presence of openings such as apertures or spaces in the material, and/or method of forming. In one example, the first zone has a first shape which defines the first response, the second zone has a second shape which defines the second response, and the first shape is different than the second shape.

In another example, the suspension member includes a medial portion is disposed between the first and second lateral portions and is configured such that the first zone includes the medial portion, and the second zone includes the first and second lateral portions. In one example, the first zone including the medial portion can have a first shape which defines the first response and the second zone including the lateral portions has a second shape which defines the second response, where the first shape is different than the second shape. In one example, the medial portion is characterized by a first elastic modulus such that the first response provided by the first zone includes a stiffness response defined by the first elastic modulus, the first and second lateral portions are characterized by a second elastic modulus such that the second response provided by the second zone includes a stiffness response defined by the second elastic modulus, and the first elastic modulus is greater than the second elastic modulus. In one example, the first zone including the medial portion is made of a first material and the second zone including the lateral portions is made of a second material, where the first material is different than the second material.

In one example, the suspension member can include at least one aperture formed in one of the first and the second zones and configured such that the response of the one of the first and the second zones is defined by the at least one aperture. In another example, the suspension member can include a third zone configured to provide a third response to the occupant load, the third zone including at least one aperture formed in the suspension member. In one example, the suspension member is made of a textile material which can include at least one of a woven structure, a knitted structure which can include a 3D knitted structure, and a combination knitted-woven structure. In a non-limiting example, the textile material can be formed of fibers including one or more of a monofilament fiber, a polyfilament fiber, an animal fiber, a plant-based fiber, a synthetic fiber, a ceramic-based fiber, a carbon-based fiber, and a metal fiber. In one example, the suspension member includes a first textile structure forming the first zone and a second textile forming the second zone. Each of the first and second textile structures includes at least one of a woven and a knitted structure configured such that the first textile structure is different than the second textile structure. The first textile structure can be different than the second textile structure in at least one of a stitch type, a stitch pattern, a needle size, a yarn type, a yarn denier, a fiber type, a fiber size, a stitch density, a warp pattern, a weft pattern, and a weave type, and a forming method including for example, knitting, weaving, crochet, and/or a combination of at least two of these methods, such that the response provided by the first zone is different than the response provided by the second zone of the suspension member. In another example, the suspension member includes a first textile material forming one of the zones and a homogeneous material forming another of the zones.

The suspension member as described herein is advantaged by a relatively lower weight as compared with a seat suspension made primarily of metal-based materials. Further, the suspension member described herein is relatively thinner than a seat suspension including metal spring elements such as serpentine and/or coil springs, such that the suspension member described herein requires less packaging space in the vehicle and/or seat assembly, where the packaging space saved can advantageously be allocated to other areas of the vehicle such as head room, leg room, etc. The plurality of zones formed in the suspension member, with each zone producing a different response to an occupant load exerted by an occupant seated in the vehicle seat, advantageously increases the contact area of an occupant with the vehicle seat to reduce the maximum contact pressure over the contact area, as compared to a spring seat suspension, where the spring suspension may typically be made of a metal-based material and/or include one or more spring components for providing the response to the occupant load. The non-metallic materials used to form the suspension member described herein, including for example, molded polymeric materials and woven and/or knitted textile materials, advantageously provide relatively better damping of vehicle inputs such as vibration, noise and road feel as compared with a convention seat suspension formed of metal-based materials.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
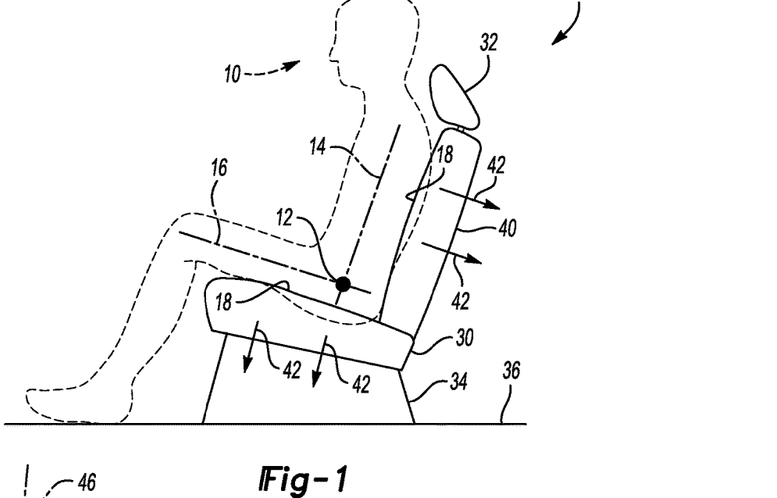
FIG. 1 schematically illustrates a side view of a seat assembly including a lower seat and a seat back, and showing an occupant occupying the seat assembly in a seated position.

Referring to the drawings, wherein like reference numerals correspond to like or similar components throughout the several Figures, FIG. 1 illustrates a seat assembly 100 which includes a generally horizontal lower seat 30 and a generally vertical seat back 40, and can include a headrest 32. An occupant 10 is shown in a seated position occupying the seat assembly 100. The lower seat 30 is operatively attached to a base 34. In one example, the seat assembly 100 can be a vehicle seat for seating a vehicle occupant 10. The seat 100 can be one of a front driver seat, a front passenger seat, a rear passenger seat. The vehicle seat 100 can be an individual seat, also referred to as a bucket seat, or a bench seat capable of seating for more than one occupant 10. In one example, the seat assembly 100 can be a front seat assembly of the vehicle such that the base 34 is attached to a structural element 36 of the vehicle. In the example of a front seat assembly 100, the structural element 36 can be a floor of the vehicle and the position of one or more of the front seat assembly 100, the lower seat 30 and the seat back 40 can be adjustable to accommodate occupants 10 of varying size and shape, for example, to adjust the head room and/or the leg room of a particular occupant 10, and/or to adjust the angle of the lower seat 30 and/or the seat back 40 relative to the H-point 12, the torso line 14 and/or the thigh line 16 of a particular occupant 10. For example, the base 34 can include one or more mechanisms (not shown) for adjusting the position of the seat assembly 100 relative to the vehicle floor 36 such that the seat assembly 100 can be raised or lowered relative to the vehicle floor 36, and/or moved forward or backward relative to the vehicle floor 36. The base 34, the lower seat 30 and/or the seat back 40 can include one or more mechanisms (not shown) for changing the angle of the lower seat 30 and/or the seat back 40 relative to the vehicle floor 36, and/or relative to the H-point 12, torso line 14, and/or thigh line 16 of the occupant 10. In another example, the seat assembly 100 can be a rear seat assembly of the vehicle, such that, in one example, the base 34 can be integral to the structural element 36, for example, may be defined by a floor pan of the vehicle.

Figures 2, 3:
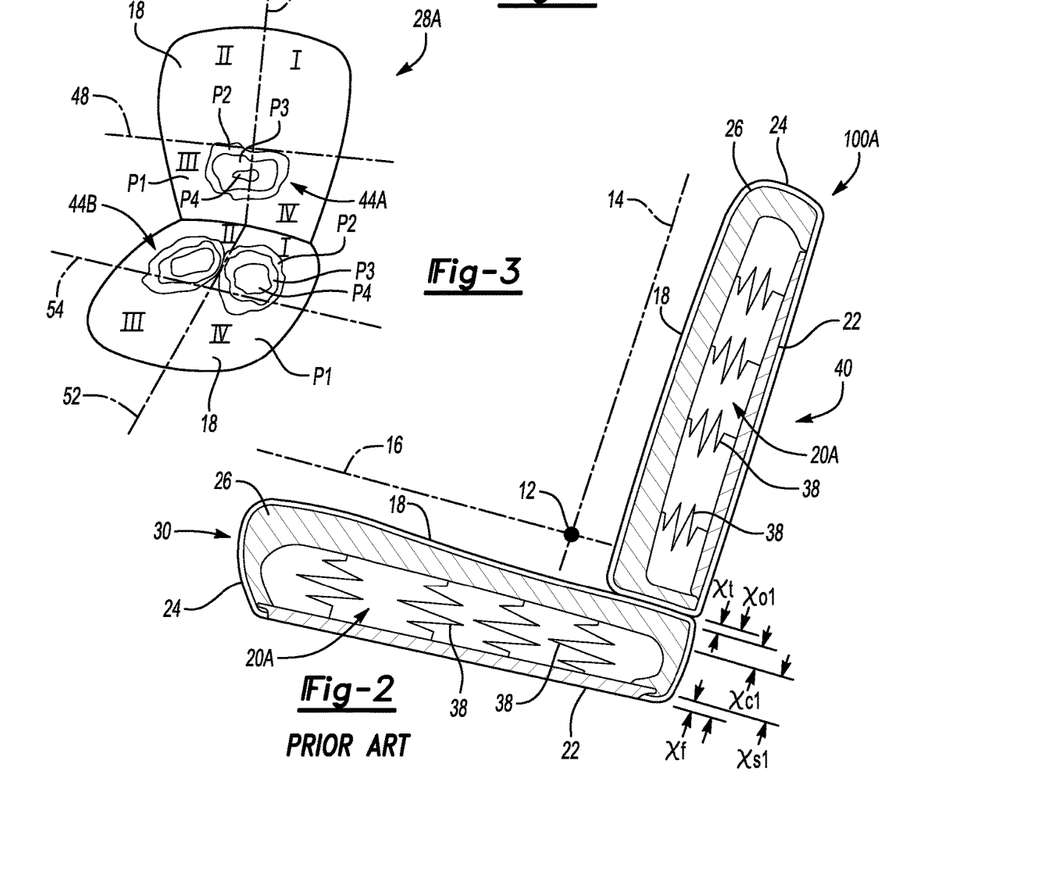
FIG. 2 schematically illustrates a cross-sectional view of a seat assembly including a trim material covering a cushion, a suspension, and a frame, where the suspension is a metal suspension including spring elements as known in the art.
FIG. 3 schematically illustrates an example of a pressure distribution map of a seated occupant showing a sub-optimized pressure distribution.
Figures 4, 5, 6:
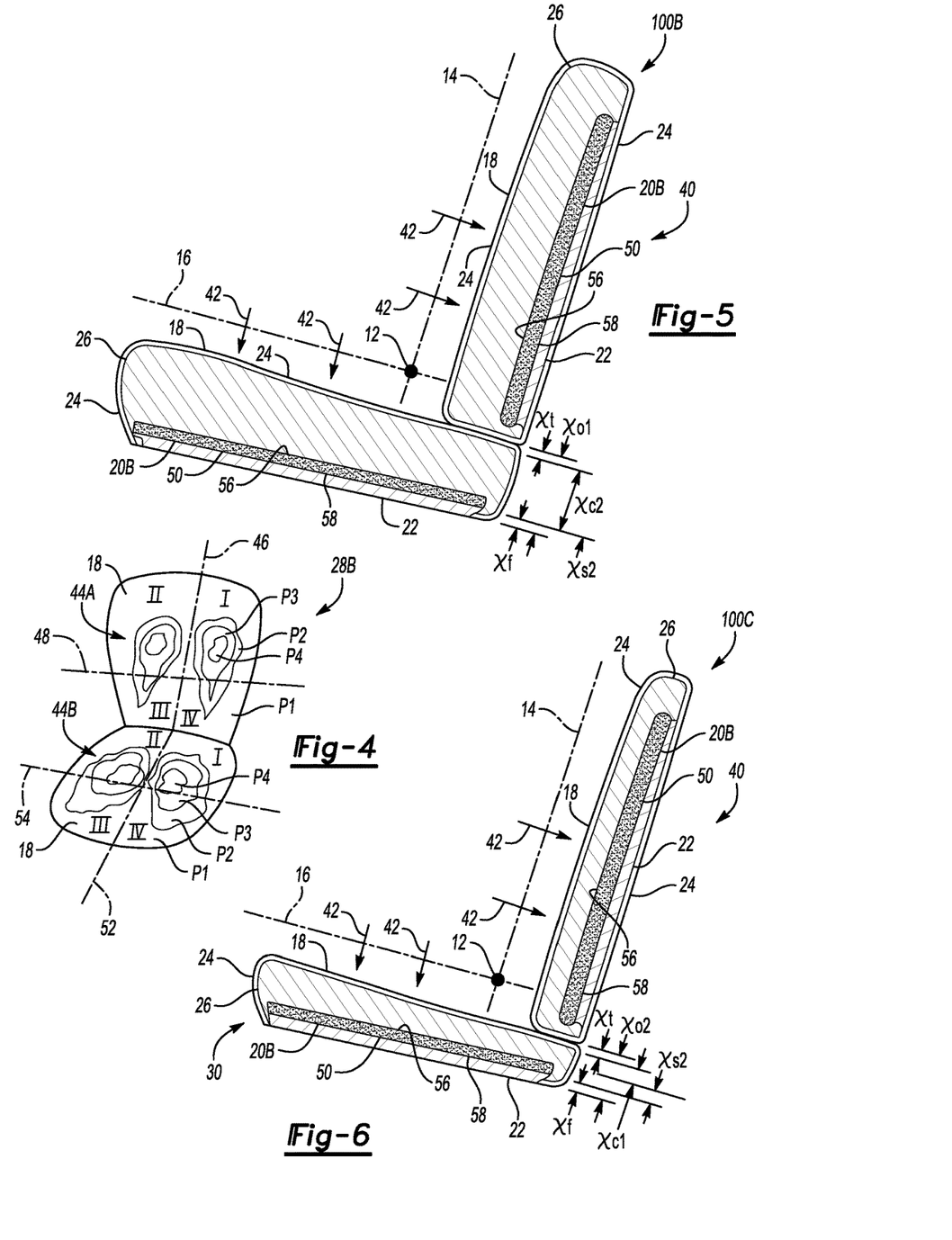
FIG. 4 schematically illustrates an example of a pressure distribution map of a seated occupant showing a preferred pressure distribution.
FIG. 5 schematically illustrates a cross-sectional view of a seat assembly including a suspension member having spatially varying mechanical properties which can be advantageously configured for proper distribution of contact pressure of a seated occupant over a relatively larger contact area of the seat assembly surface, in accordance with the disclosure.
FIG. 6 schematically illustrates a cross-sectional view of the seat assembly of FIG. 5, including a cushion of reduced thickness, in accordance with the disclosure.

Referring to FIGS. 2, 5 and 6, cross-sectional views of example seat assemblies 100A, 100B, 100C are illustrated, showing each of the lower seat 30 and the seat back 40 including a frame 22, trim material 24, a cushion 26, and a suspension 20. The frame 22 provides the support structure to attach the seat back 40 and lower seat 30 to each other and/or to attach the seat assembly 100 to a seat base 34 and/or vehicle structure 36. The trim material 24 is used to cover the cushion 26, the suspension 20, and the frame 22, and includes a contact surface 18 which is in contact with an occupant 10 seated in the seat assembly 100. The trim material 24 can include any material suitable for covering the cushion 26 and providing the contact surface 18, including, for example, one or a combination of more than one of a cloth, leather, or polymer material of sufficient durability, thickness, and appearance quality to be suitable for use in seat trim applications. The cushion 26 is typically made of a foam material and can be secured to the frame 22. In the example shown, the suspension 20 is disposed between the cushion 26 and the frame 22, such that the vehicle inputs, such as vibration, noise and road feel transmitted from the vehicle structure 36 to the contact surface 18 via the suspension 20, the cushion 26 and the trim material 24 can be at least partially dampened and/or isolated from the seated occupant 10 by the combination of the trim material 24, the cushion 26, and the suspension 20. Similarly, an occupant load (indicated by arrows 42 in FIG. 1) of a seated occupant 10 applied to the contact surface 18 generates a load force which is transmitted through the trim material 24, the cushion 26 and the suspension 20. The combination of the trim material 24, the cushion 26 and the suspension 20 generate a response to the occupant load 42 which includes a contact pressure exerted on the seated occupant 10. The contact pressure is distributed over a contact area of the occupant 10 with the contact surface 18 of the seat assembly 100. It would be appreciated that, by increasing the size of the contact area, e.g., by increasing conformance of the contact surface 18 to the seated occupant 10, the occupant load can be distributed over the increased contact area, thereby reducing the maximum contact pressure exerted on the occupant 10 in response to the occupant load 42.

The response generated by the combination of the trim material 24, the cushion 26 and the suspension 20 can include, by way of non-limiting example, one or more of a stiffness response, an energy dissipation response, and a thermal response, such that the response of a suspension member 50 to an occupant load 24, as described herein, can include a mechanical response, a thermal response, or a combination of these. A stiffness response, as that term is used herein, can include one or more of the trim material 24, the cushion 26 and the suspension 20 being deformed by the occupant load 42 to conform to the occupant 10, where the amount and direction of the deformation can vary with the magnitude and direction of the occupant load 42 and with the composition and configuration of each of the trim material 24, the cushion 26 and the suspension 20. The energy dissipation response, by way of non-limiting example, includes a damping response. The contact pressure generated by one or more of the trim material 24, the cushion 26 and the suspension 20 in response to the occupant load 42, is distributed over the contact area in a pressure distribution gradient 28 which includes a maximum contact pressure P4 (see FIGS. 3 and 4) experienced by the occupant 10. A thermal response, by way of non-limiting example, can include one or more of a heat storage response, a thermal conductivity response, a thermal diffusivity response, a fluid flow resistance response, and a moisture diffusion response.

The seat assembly 100A shown in FIG. 2 includes a spring suspension 20A including spring elements 38 which are typically made of a metal-based material. Spring element 38 can be shaped, for example, as a coil spring, a serpentine spring, a zig-zag spring, a wire spring, a compression spring, a conical spring, a magazine spring, a barrel spring, etc., or a combination of spring elements 26 of one or more shapes can be used to form the suspension 20A. In one example, the spring elements 26 are attached to a suspension bracket (not shown) which can also be made of a metal-based material, such as steel or aluminum, to form the suspension 20A shown in FIG. 2. The suspension 20A including spring elements 38 may also be referred to herein as a spring suspension 20A, and is also known as a serpentine suspension, a basket suspension or metal wire suspension. The overall thickness Xo1 of the lower seat 30 shown in FIG. 2 is determined by the thickness Xt of the trim material 24, the thickness Xc1 of the cushion 26, the thickness Xs1 of the suspension 20$a$, and the thickness Xf of the frame 22.

The seat assemblies 100B and 100C shown, respectively, in FIGS. 5 and 6, include a suspension 20B which is made of a suspension member 50 having spatially varying mechanical properties which can be advantageously configured for distribution of the load 42 of a seated occupant 10 over a relatively larger contact area of the contact surface 18 of the seat assemblies 100B, 100C, such that the maximum contact pressure is decreased and the contact pressure is distributed in a preferred pattern, as described further herein. In the non-limiting example shown in FIG. 7, and for simplicity of illustration, the suspension member 50 is shown in FIGS. 7-17 as a generally rectangular mat or pad, however it would be appreciated that the suspension member 50 is shaped, as defined by a perimeter edge 72, such that the suspension member 50 as installed into the seat assembly 100B, 100C covers a significant part of, and/or is substantially coextensive with, the contact area 18 of the lower seat 30 or the seat back 40 into which it is assembled. As described in further detail herein, the suspension member 50 is made of a non-metallic material and/or combination of materials which are molded, woven, and/or knitted to form the suspension member 50. In the installed position, the suspension member 50 can be tensioned, for example and as indicated by arrows 82 in FIG. 7, by stretching the suspension member 50 prior to and/or during attachment of the suspension member 50 to the frame 22, such that the suspension member 50 in the tensioned condition acts as a trampoline to generate a response, which can include a response such as a stiffness response, an energy dissipation response and a thermal response.

In the example shown in FIG. 5, the overall thickness Xo1 of the lower seat 30 is the same as the overall thickness Xo1 of the lower seat 30 shown in FIG. 2, such that the lower seats 30 shown in FIGS. 2 and 5 have the same packaging space in the lower seat 30. As illustrated by the example shown in the Figures, the thickness Xs2 of the suspension 20B, which in the example is defined as the thickness Xs2 of the suspension member 50, can be similar to or less than the thickness Xs1 of the conventional spring suspension 20A, and the cushion thickness Xc2 of the cushion 26 of the lower seat 30 of seat assembly 100B can be similar to or greater than the cushion thickness Xc1 of the lower seat 30 of the seat assembly 100A. The suspension member 50 is advantageously configured to provide a suspension 20B which distributes the occupant load over a wider contact area and preferentially loads the regions of the occupant's body in different parts of the contact region according to their respective load bearing capacities. Thus, the suspension 20B exhibits characteristics, including response characteristics, which are better than those of the spring suspension 20A. If such a suspension in conjunction with a cushion 26 having substantially the same thickness as that in FIG. 2 can be incorporated into the lower seat 30 of the seat assembly 100B shown in FIG. 5, the resulting seat assembly 100B provides increased comfort to a seated occupant 10 as compared with the comfort of seat assembly 100A, by increasing conformance with the occupant 10, thereby distributing the occupant load 42 over a larger contact area to reduce the maximum contact pressure experienced by the occupant 10, and by increasing the damping of vehicle inputs via the thicker cushion 26, without changing the packaging space of the seat assembly, and, for example, without sacrificing head room and/or seat height in a vehicle into which the seat assembly 100B is installed. As described in additional detail herein, the suspension 20B including the suspension member 50 is advantageously configured with spatially varying mechanical properties which generate a response to an occupant load 10 that provides a relative improvement (reduction) in maximum contact pressure P4 and in contact pressure distribution 28 (see FIGS. 2 and 3), as compared with a spring suspension 20A, such that the occupant comfort of seat assembly 100B is further improved relative to seat assembly 100A by the relative improvement in contact pressure distribution provided by the suspension member 50. It would be appreciated that the seat back 40 of the seat assembly 100B can be configured with a suspension 20B including a suspension member 50 having a thickness Xs2 and a cushion 26 having a thickness Xc2 such that the occupant comfort and damping performance of the seat back 40 of seat assembly 100B is improved relative to the seat back 40 of seat assembly 100A, without changing the packaging space of the seat assembly, e.g., without sacrificing leg room and/or forward/aft adjustment range of the seat assembly 100B.

In the example shown in FIG. 6, the overall thickness Xo2 of the lower seat 30 of seat assembly 100C is the substantially less than the overall thickness Xo1 of the lower seats 30 shown in FIGS. 2 and 5, such that the lower seat 30 shown in FIG. 6 consumes substantially less packaging space in the vehicle relative to the lower seats 30 shown in FIGS. 2 and 5. As shown in the Figures, the thickness Xs2 of the suspension 20B, e.g., the thickness Xs2 of the suspension member 50, is the same as or less than the thickness Xs1 of the spring suspension 20A, however the cushion thickness Xc1 of the cushion 26 of the lower seat 30 of seat assembly 100C is the same as or less than the cushion thickness Xc1 of the lower seat 30 of the seat assembly 100A. Thus, the seat assembly 100C and the lower seat 30 shown in FIG. 6 consumes less packaging space in the vehicle while providing comfort and damping features which are substantially the same as seat assembly 100A. As such, the lower seat 30 shown in FIG. 6 provides improved suspension characteristics with equivalent or better cushion comfort and damping characteristics relative to the lower seat 30 shown in FIG. 2, with the additional advantage of reducing the packaging space of the lower seat 30 by decreasing the overall thickness of the lower seat 30 to Xo2. The difference (Xo1−Xo2) in seat thickness of the seat assembly 100C, as compared with the seat assembly 100A, can be advantageously reallocated in the overall packaging of the vehicle, for example, to provide one or more of an increased range of seat height adjustment, an increase in headroom provided by the increased vertical distance between the contact surface 18 of the lower seat 30 of seat assembly 100C and the interior roof of the vehicle, and a decrease in the overall height of the vehicle. In this example, the height of the exterior roofline of the vehicle can be decreased by the difference (Xo1−Xo2) in the thickness of the lower seat 30 while maintaining headroom in the interior of the vehicle, such that vehicle dynamics are improved, and vehicle drag is reduced, contributing to an improvement in fuel efficiency. It would be appreciated that the seat back 40 of the seat assembly 100C shown in FIG. 6 provides improved suspension characteristics with equivalent or better cushion comfort and damping characteristics as compared with the seat back 40 shown in FIG. 2, and with the additional advantage of reducing the packaging space of the seat back 40 by decreasing the overall thickness of the seat back 40 to Xo2. The difference (Xo1−Xo2) in seat back thickness can be advantageously reallocated in the overall packaging of the vehicle, for example, to provide one or more of an increased range of forward/aft adjustment of the seat assembly 100C, an increase in legroom provided by the increased longitudinal distance from the contact surface 18 of the seat back 40 of seat assembly 100C to the front floor pan (in the case of a front seat assembly 100C) or to the rear of the front seat (in the case of a rear seat assembly 100C), and an increase in headroom and/or fuel efficiency by decreasing the roof height of the vehicle, by the difference the interior roof of the vehicle, and a decrease in the overall height of the vehicle by the vertical component of the difference (Xo1−Xo2) in the thickness of the angled seat back 30 of the seat assembly 100C.

Referring again to FIG. 1, the vehicle occupant 10 occupying the seat assembly 100 in a seated position is in contact with contact surfaces 18 of the lower seat 30 and seat back 40. The seated occupant 10 exerts an occupant load, generally indicated by arrows 42 in FIG. 1, on the seat assembly 100 in a contact pattern and area which is specific to the particular occupant 10 and which is dependent on the physical characteristics of the particular occupant 10 including weight, height, skeletal structure, shape, etc., and the particular positioning of the occupant 10 in the seat 100 including the orientation of the occupant's torso (as indicated by torso line 14), the occupant's legs (as indicated by thigh line 12) and the positioning of the occupant's hip joints (as indicated by H-point 12). It would be further appreciated that the contact pattern and area of the occupant 10 is dynamic, changing as the occupant 10 shifts and/or moves in the seat assembly 10 over time, and/or adjusts the position of any of the seat assembly 100, the lower seat 30 or seat back 40. The seat assembly 100, via the contact surface 18, generates a response to the occupant load 10, which includes exerting a contact pressure on the occupant 10, where the contract pressure, including the maximum contact pressure and the pressure distribution gradient, is specific to the particular occupant 10. For example, the area and magnitude of the contact pressure will vary depending on the physical characteristics of the occupant 10, the position of the occupant 10 in the seat assembly 100, and the configuration of the seat assembly 100, including the configuration of each of the lower seat 30 and seat back 40, as illustrated by the example pressure distribution maps 28A, 28B shown in FIGS. 3 and 4. Each of the lower seat 30 and the seat back 40, as illustrated in cross-section in FIGS. 2, 5 and 6 and described in further detail herein, includes a trim material 24 covering a cushion 26, a suspension 20, and a frame 22, which in combination exert the contact pressure 44 on the occupant 10, in response to, e.g., in opposition to, the occupant's occupant load 42. The magnitude and area of contact pressure exerted via the contact surface 18 of the seat assembly 100 can be illustrated by a pressure distribution map 28, as shown in FIGS. 3 and 4, where pressure gradients generally indicated at 44A show the contact pressure of the seat back 40 and pressure gradients generally indicted at 44B show the contact pressure of the lower seat 30. In the examples shown, pressure gradients P1, P2, P3, P4 illustrate areas of increasing contact pressure, that is, the area of relatively lowest contact pressure is represented by pressure gradient P1, and the area of relatively highest or maximum contact pressure is represented by pressure gradient P4. By way of example, the contact pressure in the area indicated as pressure gradient P1 may be nominal, e.g., may be minimal or negligible, such that the contact area of the surface 18 which is used to support the load 42 of a seated occupant 10 is indicated by the pressure gradients P2, P3 and P4. It would be further appreciated that vehicle inputs, such as vibration, noise, road feel, etc., can be transmitted from the vehicle structure 36 via the seat assembly 100 to the seated occupant 10, where the magnitude and characteristic of the transmitted vehicle inputs can be modified by the construction of the seat assembly 100. For example, the trim material 24, the cushion 26, and the suspension 20, individually and/or in combination with each other, can be configured to dampen and/or isolate the transmission of vehicle inputs through the seat assembly 100 to the seated occupant 10.

Referring to FIGS. 3 and 4, FIG. 3 shows an example pressure distribution map 28A which illustrates a non-optimized distribution of contact pressure 44, and FIG. 4 shows an example pressure distribution map 28B illustrating a relatively more favorable and preferred distribution of contact pressure 44. For illustrative and descriptive purposes, and referring to FIGS. 3 and 4, the contact surface 18 of the seat back 40 has been divided into quadrants I, II, III and IV by a vertical axis 46 and a transverse axis 48, such that, for example, quadrant I of the seat back 40 includes the portion of the contact surface 18 which would typically be contacted by the left upper torso including the left shoulder of a seated occupant 10. Likewise, the contact surface 18 of the lower seat 30 has been divided into quadrants I, II, III and IV by a longitudinal axis 52 and a lateral axis 54, such that, for example, quadrant I of the lower seat 30 includes the portion of the contact surface 18 which would typically be loaded by the occupant's flesh covering the left ischial tuberosity of a seated occupant 10. The ischial tuberosity may also be referred to herein as a sit bone and/or as a sitting bone.

In the non-optimized example of map 28A shown in FIG. 3, the pressure gradients generally indicated at 44A show areas P2, P3, P4 of increased contact pressure (relative to area P1) located in quadrants III and IV of the seat back 40, with the highest contact pressure generated at the vertical axis 46 and as such exerted on the lower back and lower spinal cord portion of the torso of a seated occupant 10. The pressure gradients indicated at 44B in FIG. 3 show the areas P2, P3, P4 of increased contact pressure (relative to area P1) located in quadrants I and II of the lower seat 30, with the highest contact pressures exerted on the sit bones of a seated occupant 10. In this non-optimized example, as shown by areas P2, P3 and P4 of the gradients 44A and 44B of map 28A, only 20-40% of the contact surface 18 is used to support the load 42 of a seated occupant 10, with maximum contact pressures focused on the occupant's lower back and sit bones, such that the comfort of an occupant 10 seated in a seat assembly 100 having the pressure distribution map 28A shown in FIG. 3 will be less comfortable, e.g., will experience greater discomfort, relative to being seated in a seat assembly 100 having the preferred pressure distribution map 28B shown in FIG. 4. Referring to FIG. 4, the pressure distribution pattern shown by the pressure contours generally indicated at 44A show the areas P2, P3, P4 of increased contact pressure substantially located in quadrants I and II of the seat back 40, with the highest contact pressures located centrally in each of the quadrants I and II and minimal pressure P1 at the vertical axis 46 and as such exerted across the upper back of a seated occupant 10, with minimal contact pressure exerted along the spinal column and on the lower back of a seated occupant 10, such that the pressure gradient 44A of FIG. 4 provides a greater level of comfort to the seated occupant 10 as compared with the pressure gradient 44B of FIG. 3. The pressure contours indicated at 44B in FIG. 4 show the areas P2, P3, P4 of increased contact pressure distributed between all four quadrants I, II, III and IV of the lower seat 30, such that the occupant's load 42 is distributed across more than 50% of the contact surface 18 of the lower seat 30 and distributed preferentially in the region near the sitting bones and upper thighs of a seated occupant 10, such that the pressure distribution contours 44B of FIG. 4 provide a greater level of comfort to the seated occupant 10 as compared with the pressure gradient 44B of FIG. 3. In this preferred example, as shown by areas P2, P3 and P4 of the pressure contours 44A and 44B of map 28B, more than 50% of the contact surface 18 is used to support the load 42 of a seated occupant 10, with maximum contact pressures distributed across an occupant's upper back, sit bones and thighs, such that the comfort of an occupant 10 seated in a seat assembly 100 having the pressure distribution map 28B shown in FIG. 4 is improved relative to the comfort of an occupant 10 seated in a seat assembly 100 having the non-optimized pressure distribution map 28A shown in FIG. 3.

Referring to FIGS. 5-17, and as previously described herein, the suspension 20B includes a suspension member 50 having spatially varying mechanical properties which can be advantageously configured to generate a response to an occupant load 42, including a stiffness response and an energy dissipation response. The stiffness response results in distributing the occupant load 42 of a seated occupant 10 over a relatively larger contact area of the contact surface 18 of the seat assemblies 100B, 100C, as compared with a spring suspension 20A, such that the maximum contact pressure P4 is decreased (relative to the spring suspension 20A) and the contact pressure is distributed in a preferred manner, e.g., a contact pressure pattern which approaches and/or resembles the pressure distribution map 28B shown in FIG. 4, and such that the area of the contact surface 18 used to support the occupant load 42 of a seated occupant 10 is at least 40% of the contact surface 18, is preferably greater than 50% of the contact surface 18, and more preferably uses up to 60% of the contact surface 18 to support the occupant load 42. In the non-limiting example shown in FIG. 7, and for simplicity of illustration, the suspension member 50 is shown in FIGS. 7-17 as a generally rectangular mat or pad, however it would be appreciated that the suspension member 50 is shaped, as defined by a perimeter edge 72, such that the suspension member 50 as installed into the seat assembly 100B, 100C covers a significant part of and/or is substantially coextensive with the contact area 18 of the lower seat 30 or the seat back 40 into which it is included. The suspension member 50 includes an A-surface 56 and a B-surface 58, where the A-surface 56 in the installed position in the lower seat 30 is immediately adjacent the cushion 26 and faces upward relative to the seat and toward the contact surface 18 of the lower seat 30. The A-surface 56 in the installed position in the seat back 30 is immediately adjacent the cushion 26 and faces forward relative to the vehicle and toward the contact surface 18 of the seat back 40. The B-surface 58 in the installed position in the lower seat 30 is immediately adjacent the seat frame 22 and faces downward relative to the contact surface 18 of the lower seat 30. The B-surface 58 in the installed position in the seat back 40 is immediately adjacent the seat frame 22 and faces rearward relative to the vehicle and away from the contact surface 18 of the seat back 40. The suspension member 50 can further be described as including a medial portion 76 which includes the longitudinal axis 52. The medial portion 76 is disposed between lateral portions 78 as shown in FIGS. 7-11.

For simplicity of description, and referring to FIGS. 7-17, the suspension member 50 will be described as configured for installation into a lower seat 30. It would be understood that the examples and configurations described for installation of the suspension member 50 into a lower seat 30 can be applied to a suspension member 50 configured for installation into a seat back 40. The lower seat suspension member 50 shown in FIG. 7 has been divided into quadrants I, II, III and IV by the longitudinal axis 52 and the lateral axis 54, such that, for example, quadrant I of the lower seat 30 includes the portion of the contact surface 18 which would typically be contacted by the left ischial tuberosity of a seated occupant 10. The quadrant identifiers I, II, III and IV and H-point 12 indicating the position of the H-point of a seated occupant 10 relative to the suspension member 50, is shown in each of the FIGS. 7-17, for orientation relative to one or more zones 60, 70, 80 of the suspension member 50, where each of the zones 60, 70, 80 can be made of a different material, and/or have different mechanical and/or material properties, including differences in elastic modulus, damping, thermal conductivity, density, resistance to fluid flow, etc., than another of the zones 60, 70, 80, and such that the response generated in response to an occupant load 42 by each of the zones 60, 70, 80 is different than the response generated by another of the zones 60, 70 80 to the occupant load 42. The example of zones 60, 70, 80 is non-limiting, and it would be appreciated that the suspension member 50 can include one, two, three, or more zones as required to provide the desired contact pressure distribution, damping and comfort characteristics specified for the particular seat assembly 100B, 100C. Further, a zone can be defined by an area of the suspension member 50 made of a single suspension material 60, such as medial and lateral portions 76, 78 shown in FIGS. 8-11, where the zone in this example is differentiated by shape, thickness and/or geometric configuration of the areas identified as the medial and lateral portions 76, 78, and where the difference in one or more of the shape, thickness and/or geometric configuration defines the area (zone) within the suspension member 50 having mechanical properties which differ from the mechanical properties of another area (zone) of the suspension member 50 such that the response generated by each of the zones to an occupant load 42 of a seated occupant 10 is different than the response generated by another of the zones to the occupant load 42. It would be appreciated that in the example shown in FIGS. 8 and 9, although the suspension member 50 is made of a homogeneous suspension material 60, the medial portion (zone) 76 exhibits different mechanical properties, including different deflection characteristics and load dissipation characteristics, than the lateral portions (zones) 78, due to the different thickness of the suspension member 50 in the different zones 76, 78, such that the response generated by each of the lateral portions 76 to an occupant load 42 of a seated occupant 10 is different than the response generated by the medial portion 78 to the occupant load 42. The term "homogeneous material" as used herein, refers to a material which is uniform and structure and composition throughout, such as a polymer-based material which may be a molded material or an elastomeric material, a solid metal-based material, etc.

Referring again to FIGS. 7-17, the H-point, as that term is used herein, refers to the mid-point of a line connecting the hip joints of the occupant 10, where the position the hip joints of a seated occupant relative to the suspension member 50 are indicated at 62 in FIG. 7. A thigh line 16 is shown extending from each of the hip joint indicators 62, to show the orientation of the thigh and knee relative to the H-point 12. It would be understood that the actual position of the H-point 12, the hip joints 62, and the thigh lines 16 of a particular occupant 10, relative to the suspension member 50, is determined by the particular occupant 10, and can vary from one occupant 10 to another depending on the particular occupant's weight, shape, size, seating position, etc. It would be appreciated that position of the occupant 10, the contact area and resultant contact pressure distribution 28 of the seated occupant 10 may not be symmetrical relative to the central axis of the seat assembly 100B, 100C, e.g., in a seated position, the torso line 14 (see FIGS. 1, 5 and 6) of the occupant 10 may be skewed relative to the vertical axis 46 of the seat back 40, and/or the thigh lines 16 may be skewed relative to each other and/or to the longitudinal axis 52 of the lower seat 30. As such, the suspension member 50 can be configured such that the zones 60, 70, 80 are not necessarily the same or mirror images of each other about the central axes 46, 52, and the zones 60, 70, 80 can be configured differently in consideration of differences in the occupant load imposed in the various quadrants I, II, III, IV of the suspension member 50. In a non-limiting example, the size, shape, material and/or mechanical properties of one or more of zones 60, 70, 80 in quadrants II and III can differ from the size, shape, material and/or mechanical properties of one or more of zones 60, 70, 80 in quadrants I and IV to compensate for known differences in contact loads exerted by a driver-occupant 10 in a vehicle seat assembly 100B, 100C configured as a driver seat assembly in a vehicle. Using the illustration of a left side driver's seat, as found in vehicles driven in the United States, for example, it would be appreciated that the driver occupant 10 uses the right leg to operate the accelerator and brake pedals of the vehicle, and may show a propensity to lean toward the center of the vehicle, for example, to operate controls in a center instrument panel, such that the occupant load 42 exerted by the driver occupant 10 can be greater in quadrants II and III than in quadrants I and IV. As such, the suspension member 50 can include one or more zones 60, 70, 80 in quadrants II and III which can differ in size, shape, material content, mechanical properties, etc., than the one or more zones 60, 70, 80 included in quadrants I and IV of the suspension member 50. In another example, the seat assembly 100B, 100C may be configured for installation as a driver's seat in a vehicle having a manual transmission, where the lower seat suspension member 50 can include one or more zones 60, 70, 80 in quadrants I and IV which are configured, referring to the United States vehicle example, considering the driver-occupant load imposed on the contact surface 18 of the lower seat 30 when using the left leg to operate the clutch. Similarly, the seat back suspension member 50 can include one or more zones in quadrants II and III considering the driver-occupant load imposed on the contact surface 18 of the seat back 40 when using the right arm to operate the shift lever, resulting in a non-symmetrical loading of the seat back 40 relative to the vertical axis 46.

Figure 7:
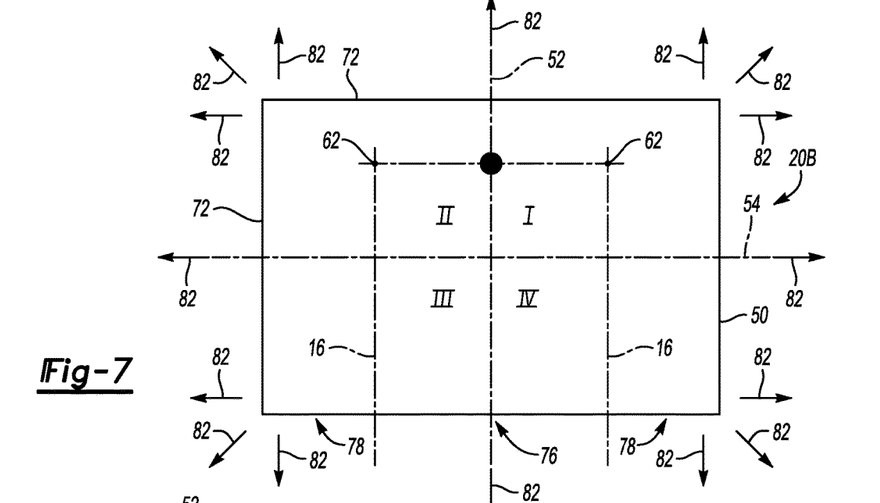
FIG. 7 schematically illustrates a top view of the suspension member of the lower seat of the seat assembly of FIG. 5, in accordance with the disclosure.

The suspension member 50 can be attached, in the installed position in the lower seat 30 or seat back 40, to the frame 22, by any suitable attachment means, including, by way of non-limiting example, the use of fasteners, clips, adhesive, In one example, in the installed position, the suspension member 50 can be tensioned, for example and as indicated by arrows 82 in FIG. 7, by stretching the suspension member 50 prior to or during attachment of the suspension member 50 to the frame 22, such that the suspension member 50 in the installed position is maintained in a tensioned condition and can act as a trampoline, generating a response to an occupant load 42 which can include deflecting the suspension member 50 to absorb and dissipate the load of an occupant 10 seated in the seat assembly 100B, 100C. By way of non-limiting example, the suspension member 50 in the tensioned conditioned may be stretched more in one direction than another in the installed condition. For example, as installed the suspension member 50 can be tensioned laterally by a first amount, which may be expressed as a first percentage stretch, and tensioned longitudinally by a second amount different from the first amount, which may be expressed as a second percentage stretch, where the first and second amounts may be different.

As described in further detail herein, the suspension member 50 includes a suspension material and/or combination of suspension materials 60 which are molded, woven, crocheted and/or knitted to form the suspension member 50. By way of non-limiting example, the suspension material and/or combination of materials 60 forming the suspension member 50 are preferable non-metallic materials, and/or the metallic content of the combination of suspension materials 60 is minimized relative to the non-metallic contact, such that the suspension 20A including the suspension member 50 described herein weighs relatively less than the convention metal spring suspension 20A illustrated in FIG. 2. In a non-limiting example, the suspension 20B including the suspension member 50 has a reduced mass in the range of 15% to 40% as compared with a spring suspension 20A. The reduced mass can advantageously contribute to weight savings and improved fuel efficiency of the vehicle.

Figures 8, 9, 10, 11:
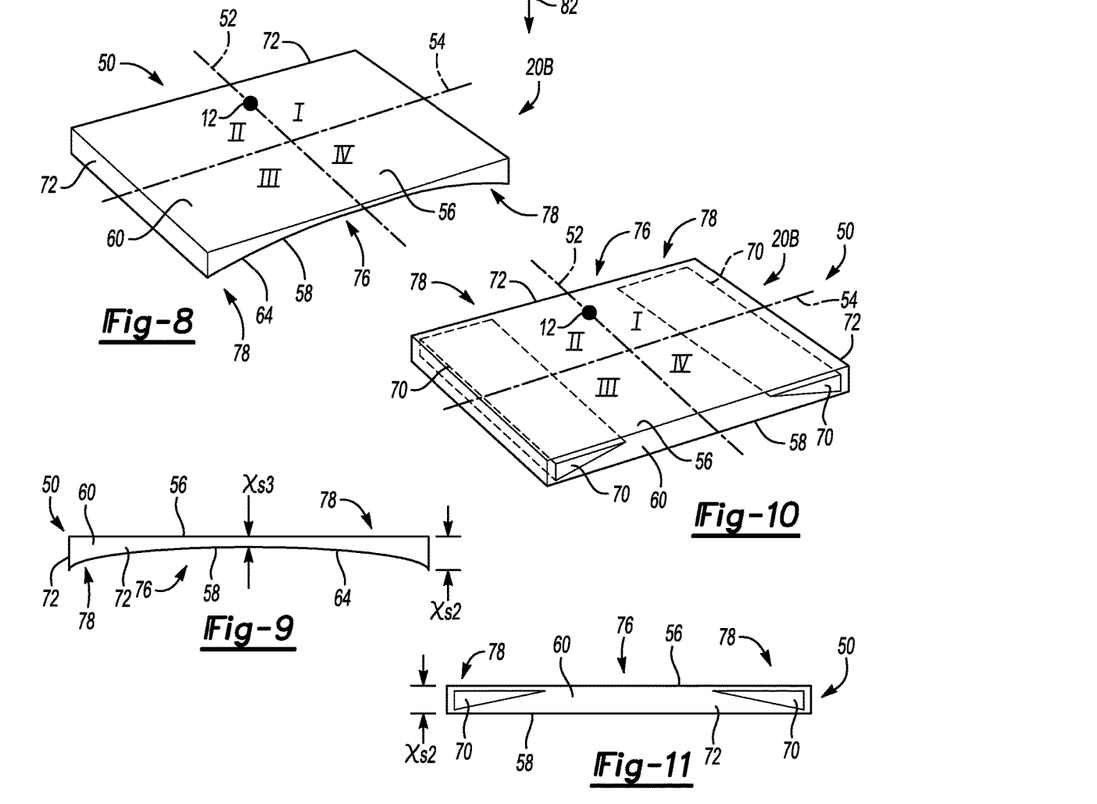
FIG. 8 schematically illustrates a perspective view of a first example of the suspension of FIG. 7, in accordance with the disclosure.
FIG. 9 schematically illustrates an end view of the suspension of FIG. 8, in accordance with the disclosure.
FIG. 10 schematically illustrates a perspective view of a second example of the suspension of FIG. 7, in accordance with the disclosure.
FIG. 11 schematically illustrates an end view of the suspension of FIG. 10, in accordance with the disclosure.

Referring to FIGS. 8 and 9, shown is an example configuration of the suspension member 50 made of a suspension material 60, and having a concave portion defined by the medial portion 76 of the suspension member 50, such that the B-surface 58 of the suspension member 50 is arched relative to the A-surface 56, which is substantially flat in the example shown. The arched cross-sectional has a thickness Xs2 at the perimeter edge 72 of the lateral portions 78 which tapers to a smaller thickness Xs3 at the longitudinal axis 52, such that the medial portion 76 of the suspension member 50 is thinner than the lateral portions 78, and such that the medial portion 76 has a first cross-sectional shape and defines a first zone of the suspension member 50 and the lateral portions 78 have a second cross-sectional shape and define second and third zones of the suspension member 50, where the response to an occupant load 24 and the load dissipation behavior varies by zone between portions 76 and 78. In the example shown in FIGS. 8 and 9, the suspension member 50 is made of a flexible material 60, such that the thinner medial portion 76 deflects to a greater degree under an occupant load of a seated occupant 10, and such that the lateral portions 78 are deflected toward the seated occupant 10 to increase the conformance of the suspension member 50 to the seated occupant 10 in medial portion 76 and the lateral portions 78, expanding the contact area and distributing the occupant load 42 such that the pressure distribution 28 is expanded into the lateral portions 78 of the suspension member 50, and the maximum contact pressure P4 is reduced by the deflection of the lateral portions (zones) 78 relative to the deflection of the medial portion (zone) 76. In one example, the suspension member 50 shown in FIGS. 8 and 9 can be made of a homogeneous material, which can be a non-metallic material such as an elastomeric material, a silicone material and/or a polyurethane material, and can be formed by molding. The example is non-limiting and it would be appreciated that the suspension member 50 shown in FIGS. 8 and 9 could be made of a metal-based material, for example, formed by stamping and/or bending to provide lateral portions 78 having a thickness greater than the medial portion 76 such that the metal-based suspension member 50 the thinner medial portion 76 deflects to a greater degree under an occupant load of a seated occupant 10, and such that the lateral portions 78 are deflected toward the seated occupant 10 to increase the conformance of the suspension member 50 to the seated occupant 10 in medial portion 76 and the lateral portions 78.

The example shown in FIGS. 8 and 9 is non-limiting, and it would be appreciated that the bending and deflection mechanism and the distribution pattern described for the suspension member 50 of FIGS. 8 and 9 can be achieved by incorporating geometric features which provide a bending, deflection and load dissipation effect substantially equivalent to that provided by the arched shape of the suspension member 50 shown in FIGS. 8 and 9. In one example, the B-surface 58 of the suspension member 50 can include a plurality of ribs extending longitudinally along the B-surface 58, where the ribs (not shown) are of the size, pattern and geometric shape to cause the medial portion 76 to deflect to a greater degree under an occupant load of a seated occupant 10, such that the lateral portions 78 are deflected toward the seated occupant 10, expanding the contact area and dissipating the occupant load such that the pressure distribution is expanded into the lateral portions 78 of the suspension member 50, and the maximum contact pressure is reduced by the deflection of the lateral portions (zones) 78 relative to the deflection of the medial portion (zone) 76. It would be appreciated that other geometric features can be incorporated into the suspension member 50 to achieve a similar deflection response. For example, living hinges formed integrally to the suspension member 50 between the medial portion 76 and each of the lateral portions 78 can be actuated by the occupant load deflecting the suspension member 50 such that the medial portion 76 is deflected to a greater degree relative to the lateral portions 78 as the hinges are actuated by the occupant load 42.

By way of non-limiting example, the suspension member 50 can further include a layer 64 applied to the B-surface 58, configured to generate a response which increases the conformance of the suspension member 50 to the seated occupant 10 in response to the occupant load 42. The layer 64 can be formed from one of a non-metallic or metallic material and adhered to the B-surface 58 by bonding, and can be shaped to complement, e.g., conform to, the shape of the B-surface 58. In one example, the layer 64 can be arched. In another example, the layer 64 can include one or more bending or flexing features such as ribs or living hinges, as described previously which can be actuated by the occupant load 42 to increase conformance of the suspension member 50 to the seated occupant 10, thus increasing dissipation of the contact pressure over a greater contact area of the contact surface 18. By way of example, the layer 64 is a formed from one of a relatively thin sheet of metal such as spring steel or an aluminum based material, and a polymeric material.

FIGS. 10 and 11 illustrate another example of a suspension member 50 which include a zone 70 which is substantially wedge-shaped, for example, formed as a triangular prism, in each of the lateral portions 78 of the suspension member 50, where the thickness of the zone 70 is shaped such that the zone 70 is tapered laterally from a thick end immediately adjacent the perimeter edge 72 to a thin edge which is immediately adjacent the medial portion 76. The suspension member 50 excluding the zones 70 are formed of a suspension material 60 which has a relatively lower elastic modulus than the elastic modulus of the material forming the zones 70, such that the medial portion 76 having a lower elastic modulus deflects to a greater degree than the higher modulus zones 70 under an occupant load 42 of a seated occupant 10, and such that the zones 70 formed in the lateral portions 78 in response to the occupant load 10 deflect toward the seated occupant 10 to increase the conformance of the suspension member 50 to the seated occupant 10, expanding the contact area and dissipating the occupant load 42 such that the pressure distribution 28 is expanded into the lateral portions 78 of the suspension member 50, and the maximum contact pressure is reduced by the deflection of the lateral portions 78 (including zones 70 formed of a material having a relatively higher modulus) relative to the deflection of the medial portion 76 formed of the relatively lower modulus suspension material 60. In one example, the suspension member 50 including the zones 70 are molded using a low modulus polymeric suspension material 60, and the suspension material 60 in the zones 70 is selectively treated with a cross-linking agent to increase cross-linking of the polymeric material 60 in the zones 70, such that the zones 70 exhibit a higher modulus than the non-treated lower modulus material 60 forming the medial portion 76 of the suspension member 50. In another example, the suspension member 50 shown in FIGS. 10 and 11 is formed in a stage molding process, where in one stage the zones 70 are molded using a higher modulus polymeric material, and in another stage the remainder of the suspension member 50 including the medial portion 76 is molded using a lower modulus polymeric material. In another example, a lower modulus polymeric material 60 is molded to form the suspension member 50 to receive the wedge shaped zones 70, the wedge shaped zones 70 are formed as separate elements from a higher modulus polymeric material and inserted into and/or attached to the suspension member 50 as shown in FIGS. 10 and 11, for example, using bonding, fusion welding, an adhesive, or other suitable method to form the suspension member 50 including the zones 70 shown in FIGS. 10 and 11. The example is non-limiting and it would be appreciated that the suspension member 50 shown in FIGS. 10 and 11 could be made of a metal-based material, for example, formed by stamping and/or bending to which a wedge-shaped members could be bonded and/or inserted to form the zones 60, such that metal-based portion 76 deflects to a greater degree under an occupant load of a seated occupant 10, and such that the lateral portions 78 including the wedge-shaped members forming zones 70 are deflected toward the seated occupant 10 to increase the conformance of the suspension member 50 to the seated occupant 10 in medial portion 76 and the lateral portions 78.

Additional example configurations of suspension members 50 are shown in FIGS. 12-17. For simplicity of illustration, only one-half of the suspension member 50, e.g., quadrants II and III of the suspension member 50 is shown in each of the FIGS. 12-17. It is appreciated that the configuration of the suspension member 50 in quadrants I and IV not shown in FIGS. 12-17 can be, but is not necessarily, a mirror image of the configuration shown in quadrants II and III relative to a longitudinal axis 52 of the suspension member 50. As previously described, the size, shape, material, thermal properties and/or mechanical properties of one or more of zones 70, 80 in quadrants II and III can differ from the size, shape, material, thermal properties and/or mechanical properties of one or more of zones 60, 70, 80 in quadrants I and IV to compensate for known or anticipated differences in contact loads exerted in each of the quadrants I, II, III and IV by a seated occupant 10 on the suspension member 50.

Referring to FIGS. 12-17, the example suspension members 50 can be made of a homogeneous material, a textile material, or a combination of homogeneous and textile materials. In one example, the homogeneous material can be a non-metallic material such as polymeric foam, an elastomeric material, a silicone material and/or a polyurethane material, for example, formed by molding, pressing, etc. The term "textile material" as used herein, refers to a material which is formed by one or more of weaving, knitting, crocheting, braiding or a combination of these to form the textile material, and where weaving generates a woven structure in the textile material, knitting generates a knitted structure in the textile material, crocheting generates a crocheted structure in the material, and braiding generates a braided structure in the textile material. It would be appreciated that the textile material made using a combination of these methods could have portions of the textile material which incorporate multiple structures, for example, a knitted portion could be formed using braided fibers, fibers could be woven through a knitted or crocheted structure to provide dimensional strength and/or stabilization, a crocheted edge could be formed on a knitted or woven structure, woven layers could be knitted together to form a multi-layer textile material such as a 3D textile material, etc. The textile material can include one or more types of fiber, including one or more of an organic fiber such as an animal fiber, a plant-based fiber, a synthetic fiber such as a polymeric fiber, a carbon-based fiber, a ceramic-based fiber such as a glass-based fiber, a metal-based fiber including steel-based fiber and/or wire and aluminum-based fiber and/or wire, a blended fiber such as an animal/synthetic blended fiber, an animal/plant blended fiber, a plant/synthetic blended fiber, a glass/polymer blended fiber (fiberglass), a metal/synthetic blended fiber, etc., and/or a combination of two or more of the various fiber types. Animal fiber can include wool fiber produced from the hair and/or fur of any animal providing hair/fur suitable for fiber production, including by way of non-limiting example, sheep, goats, rabbits, llamas, etc., silk fiber produced from insect cocoons, and the like. Plant-based fiber can include fiber produced from any plant providing a plant material which is suitable for fiber production, including by way of non-limiting example, cotton, flax, wood (acetate, rayon), bamboo, jute, hemp, raffia, sisal, soy, etc. Synthetic fiber can include, by way of non-limiting example, fibers made of one or more of acrylic, kevlar, nylon, nomex, polyester, spandex, and the like. The fiber can be formed, by way of non-limiting example, by spinning, extrusion, drawing, and the like. The textile material can be formed of a yarn including a plurality of fibers which have been spun or twisted together or otherwise interlocked or joined to form a yarn. The textile material can include monofilament fiber, polyfilament fiber, staple fiber, or a combination of these.

The textile material can be formed as a multi-dimensional and/or multi-layer material, such as a 2D material, a 3D material, a multi-layer mesh material, a multi-layer woven material, and the like. The textile material can be formed using a combination of techniques. For example, the textile material can be a knitted 3D material into which weft and/or warp threads have been woven to provide for directional properties such as directional stretch ability, predetermined distortion of spaces in the textile structure under load, damping characteristics, etc., where the examples shown are not intended to be limiting. The textile material can include multiple layers formed by the same technique, such as a double-layer weave material, or where at least one of the multiple layers is formed by a different technique than another of the multiple layers. For example, the textile material can include a first layer which is a woven layer and a second layer which is a knitted layer, such that the combination of the layers generates a predetermined response from the suspension member 50 when subjected to an occupant load 42. It would be appreciated that the textile material described herein is formed by one or more of weaving, knitting, crocheting, braiding, and the like such that the fibers are spaced from one another and can move relative to each other, for example, under load, such that spacing between the fibers and the orientation of one fiber to another changes in dimension, shape, and orientation in response to a change in the direction and magnitude or the load being imposed on the textile fiber. As such, the textile material can be characterized as one or more of elastic, stretchable, porous, and conductive and capable of providing a response which can include one or more of a stiffness response, an energy dissipation response, and a thermal response as those terms have been described previously herein. It would be appreciated that the textile material, due to the porous structure provided by the spacing between fibers forming the textile, can provide for fluid flow (heat, air, and vapor including water vapor), through the textile material, where the rate and capacity of the fluid flow and diffusivity of the textile material can change as the applied load is varied. It would be appreciated that the response characteristics of a textile material can be varied by varying one or more of a stitch type, a stitch pattern, a yarn type, a yarn denier, a needle size, a fiber type, a fiber size, a stitch density, a warp pattern, a weft pattern, a weave type, a braiding pattern, etc. of the textile material, where these features of the textile material determine characteristics of the textile material including, by way of example, the density, thickness, porosity, conductivity, elasticity, etc., of the textile material, and the shape, size and orientation and dynamic response of spaces defined between the fibers in the textile material.

Referring again to FIGS. 12-17, shown is an example configuration of a suspension member 50 including a first zone 60, a second zone 70, and, as shown in FIGS. 12, 13 and 16, a third zone 80. As previously noted, for simplicity of illustration only quadrants II and III of the suspension member 50 are shown, and it would be appreciated that the configuration of quadrants I and IV can be substantially similar to, in mirror image relative to longitudinal axis 52, the configuration of quadrants II and III. As shown in FIGS. 12-17, the location of a zone 70, 80 can be varied as required to provide the desired response for a particular suspension member 50, such that the zone 70, 80 can be offset from the longitudinal axis 52 and/or the lateral axis 54 and can extend over a plurality of the quadrants I, II, III and IV. For example, zone 80 shown in FIG. 17 extends into all four quadrants I, II, III and IV of the suspension member 50. It would be further appreciated that the configuration of quadrants II and III can be the same as (in mirror image) the configuration of quadrants I and IV, or, the shape, location and size of the zones 60, 70, and 80 in quadrants I and IV can be modified from that shown for quadrants II and III to compensate for and/or accommodate the particular requirements of the seat assembly. As previously described herein, for example, the features and characteristics of the zones in each quadrant may be modified, for example, in consideration of the sitting position and leg extensions of a driver-occupant of a vehicle seat assembly 100B, 100C interacting with one or more pedals, the steering wheel, and other vehicle controls during operation of the vehicle.

Figure 12:
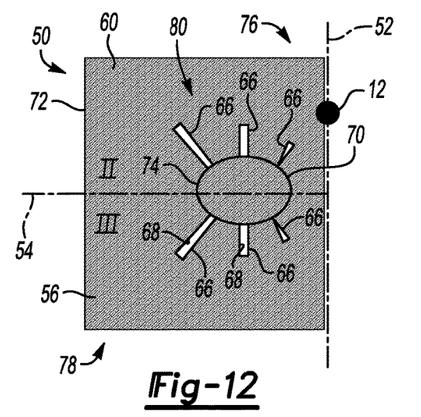
FIG. 12 schematically illustrates a partial top view of a third example of the suspension of FIG. 7, in accordance with the disclosure.

In one example, the suspension member 50 shown in FIGS. 12-17 can be made of a single material, which can be one of a homogeneous or a textile material, as those terms have been previously described herein, such that each of the zones 60, 70 and 80 are made of the same material. In this example, each of the zones 60, 70 and 80, although made of the same material, can be configured differently such that each of the zones 60, 70 and 80 provides a different response to an occupant load 42. Differences in configuration can include differences in the shape, thickness, density, etc. of one zone to another, such that at least one of a stiffness response, an energy dissipation response, and a conductivity response provided by each of the zones 60, 70, 80 will be different than the response provided by the other of the zones 60, 70, 80 when subject to an occupant load 42. For example, referring to FIG. 12, the suspension member 50 includes a first zone 60, a second zone 70 defined by a boundary 74, and a third zone 80 which includes a plurality of apertures 66 formed in the suspension member 50. In the example shown, the each of the apertures 66 opens to both the A-surface 56 and the B-surface 58 of the suspension member 58, such that the aperture 66 is formed through the entire thickness of the suspension member 50. The example is non-limiting, and it would be appreciated that the aperture 66 could be formed as a cavity which extends only partially through the thickness of the suspension member 50 such that the aperture is open to one of, but not both, the A-surface 56 and the B-surface 58 of the suspension member 50. The aperture 66 is defined by an aperture edge 68. In one example, the aperture edge 68 can be reinforced, fused, bound, stitched, or otherwise finished to maintain the shape and size and of the aperture 66 over time, e.g., after repeated loading by an occupant load 42. In an illustrative example where the suspension member 50 shown in FIG. 12 is made of a single material, which can be one of a homogeneous or textile material, the first zone 60 can be configured, for example, with a higher density and/or a greater thickness, than the second zone 70, such that when subjected to an occupant load 42, the first and second zones exhibit different stiffness responses, e.g., such that the thinner and/or less dense zone 70 deflects to a greater extent than zone 60, and such that the thicker and/or more dense zone 60 conforms to the seated occupant 10 to increase the contact area between the occupant 10 and the contact surface 18. Zone 80 provides a stiffness response which is different from that of zone 60 and of zone 70, where the apertures 66 of various size and distribution, respond to the occupant load 42 by stretching such that the deflection of zone 70 relative to zone 60 is enhanced by the extension of zone 80 due to the stretching of zone 80, and such that, in a loaded condition, the combination of zones 60, 70, and 80 are deflected to a semi-oval shape to enhance conformance of the contact surface 18 to the occupant 10, thereby increasing the contact area over which the contact pressure is dissipated, and decreasing the maximum contact pressure, to the comfort of the occupant 10. A similar mechanism can be provided by the example suspension member shown in FIG. 13, where in a loaded condition, the combination of zones 60, 70, and 80 are deflected to a flat-topped pyramid shape, to enhance conformance and dissipation as described for FIG. 12. In the example shown in FIG. 14, the suspension member 14 includes a first zone 60 which can be made of a homogeneous material or a textile material, and a second zone 70 which includes a plurality of apertures 70, such that the first and second zones 60, 70 exhibit a different response to an occupant load 10.

Figure 13:
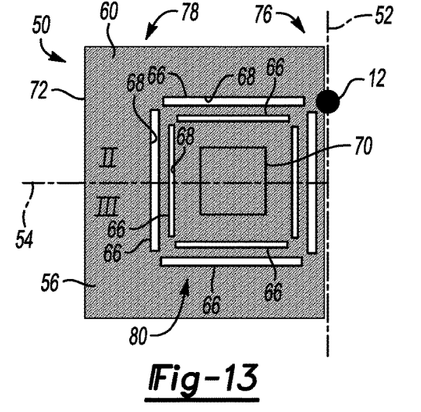
FIG. 13 schematically illustrates a partial top view of a fourth example of the suspension of FIG. 7, in accordance with the disclosure.
Figure 14:
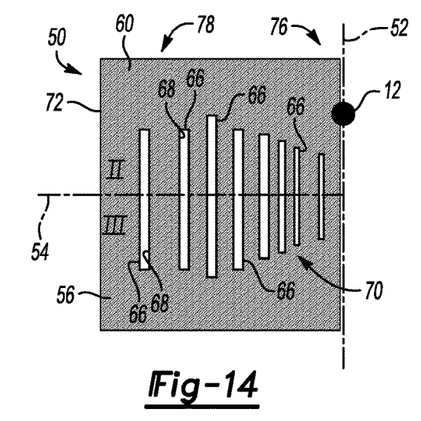
FIG. 14 schematically illustrates a partial top view of a fifth example of the suspension of FIG. 7, in accordance with the disclosure.

As shown in FIGS. 12-14, the size, shape, orientation, distribution pattern and number of apertures 66 in the suspension member 50 can be varied to provide the desired response for a particular seat assembly 100B, 100C, where the response include one or more of a stiffness response, an energy dissipation response, and a thermal response. For example, the apertures 66 can affect the stiffness response by decreasing the effective area of the suspension member 50 in the zone including the apertures 66, which can increase the deflection and/or the conformance of that zone relative to a zone of the same composition (material, thickness, density) which does not include an aperture 66. For example, the apertures 66 can affect the energy dissipation response by defining a distribution path through the material portions located between the apertures 66 for the distribution of contact pressure and/or damping of vehicle inputs. For example, the apertures 66 can affect the thermal response by providing openings through which air flow, heat transfer, vapor conductivity, etc. can occur to affect the diffusivity of the suspension member 50. By way of non-limiting example, the apertures 66 can be configured to be in fluid communication with a heating or cooling system (not shown) such that heated/cooled air can be directed through the apertures 66 to the seat assembly 100B, 100C.

Figure 15:
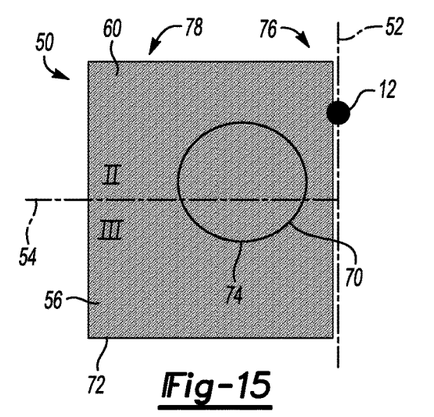
FIG. 15 schematically illustrates a partial top view of a sixth example of the suspension of FIG. 7, in accordance with the disclosure.
Figure 16:
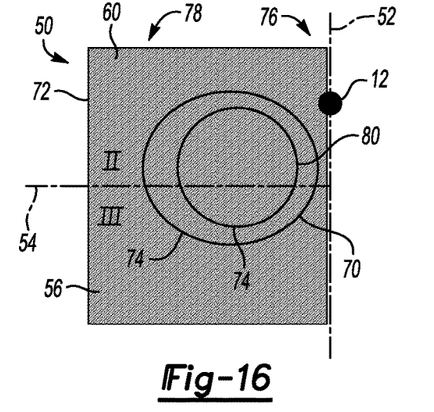
FIG. 16 schematically illustrates a partial top view of a seventh example of the suspension of FIG. 7, in accordance with the disclosure.
Figure 17:
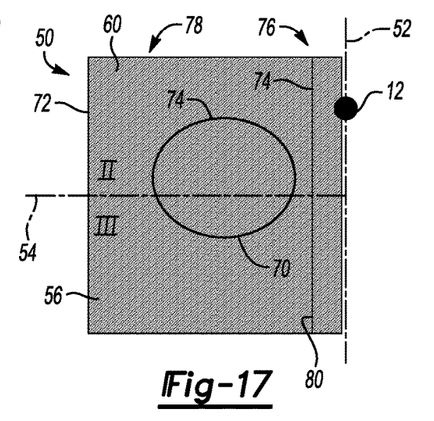
FIG. 17 schematically illustrates a partial top view of an eighth example of the suspension of FIG. 7, in accordance with the disclosure.

FIGS. 15-17 illustrate other examples of suspension members 50, which each include a plurality of zones 60, 70, 80 (FIG. 16) where each of the zones 60, 70, 80 exhibits a different response than each other one of the zones 60, 70, 80. For simplicity of illustration, each of the zones 70, 80 are shown in FIGS. 15-17 as having a boundary 74 defining a substantially oval shape. It would be appreciated that the examples shown are not limiting, and each of the zones 70, 80 can be of a shape other than the oval and rectangular shapes shown in the figures, including, for example, one of a regular shape, an irregular shape, a symmetrical shape, a non-symmetrical shape, etc., as required to provide the desired response for a particular suspension member 50 and/or seat assembly 100B, 100C.

In another example, the suspension member 50 shown in FIGS. 12-17 can include two or more materials. For example, zone 60 can be made of a first material which is one of a homogeneous material and a textile material, zone 70 can be made of a second material which is one of a homogeneous material and a textile material, and different than the first material from which zone 60 is made. Zone 80 can be made from a third material which is one of a homogeneous material and a textile material and different than the first and second materials used to form zones 60 and 70. In another example, zone 80 can be made from either the first or second materials used to made zones 60 and 70 where the response provided by zone 80 would be different from the response provided by one of the zones 60, 70 made of the same material, due to the effect of the apertures 66 formed in zone 80 (FIGS. 12 and 13) and/or due to the differences in shape, size and location of zone 80 (FIG. 16) as compared with each of zones 60, 70.

Considering the example of zone 60 formed of a first material and zone 70 formed of a second material different from the first material, the first and second materials can be attached at a boundary 74 between the zones 60, 70 such that boundary 74 defines a joint between the first material and the second material. The joint 74 can be formed, by way of non-limiting example, by one or more of bonding, fusing, stitching, knitting, crocheting, weaving, braiding, taping, adhering, clipping, pinning, and/or any other method suitable for attaching the first material to the second material, as would be determined for the types of the first and second material being joined. For example, where the first and second material are both textile materials, the first and second materials can be joined by stitching, knitting, crocheting, weaving, braiding, clipping, pinning, etc. and/or by other methods which can effectively join the textile materials including bonding and/or fusing, depending on the composition of the textile materials. In one example, one of the zones 60, 70, 80 is made of a homogenous material and another of the zones 60, 70, 80 is made of a textile material. In one example, one of the zones 60, 70, 80 is made of a first homogenous material and another of the zones 60, 70, 80 is made of a second homogeneous material. In one example, one of the zones 60, 70, 80 is made of a first textile material and another of the zones 60, 70, 80 is made of a second textile material.

The composition and configuration of a textile material included in the suspension member 50 can be varied to provide the desired response for the particular suspension member 50, where the response includes one or more of a stiffness response, an energy dissipation response, and a thermal response. For example, one or more of a stitch type, a stitch pattern, a yarn type, a yarn denier, a needle size, a fiber type, a fiber size, a stitch density, a warp pattern, a weft pattern, a weave type, a braiding pattern, etc. of the textile material, where at least these features of the textile material can determine characteristics of the textile material including, by way of example, the density, thickness, porosity, conductivity, elasticity, etc., of the textile material, and the shape, size and orientation and dynamic response of spaces defined between the fibers in the textile material, which can determine the response of the textile material when subjected to an occupant load 42, including the stiffness response, the energy dissipation response, and the thermal response. The thermal response can be affected by the spacing between the fibers of the textile material, including the size and shape of the spaces, the directionality and/or orientation of the spacing, the distortion of the spacing during loading by the occupant 10, which can cause, depending on the configuration of the textile material, the spaces to open or close, impacting air flow, heat transfer, heat and mass diffusivity, etc. Conductivity, for example, of air or water vapor, can be affected by the spacing, by the density and surface characteristics of the fiber, and the hydrophilic and hydrophobic properties of the fiber. In a non-limiting example, the suspension member 50 can include at least one zone 60, 70, 80 made of a textile material where the suspension member 50 is configured to be in fluid communication with a heating or cooling system (not shown) such that heated/cooled air can be directed through the textile material of the suspension member 50 to the seat assembly 100B, 100C.

The examples described herein are illustrative and non-limiting and it would be appreciated that the suspension members 50 shown in FIGS. 12-17 could include one or more zones made of a metal-based material configured to provide response characteristics similar to those provided by a textile material. In a non-limiting example, the metal-based material can be perforated or expanded such that material includes openings which under load can elastically deform and/or be deflected such that the shape and orientation of the openings can change dynamically with changes in the magnitude and direction of the applied occupant load to provide response characteristics as previously described herein related to textile materials.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A seat assembly for seating an occupant, wherein the seated occupant exerts an occupant load on the seat assembly, the seat assembly comprising:
   a cushion;
   a frame; and
   a suspension member;
   wherein the suspension member is positioned intermediate the cushion and the frame;
   wherein the suspension member comprises:
      a first zone configured to provide a first response to the occupant load;
      wherein the first response is a first contact pressure exerted on the seated occupant in the first zone;
      a second zone configured to provide a second response to the occupant load;
      wherein the second response is a second contact pressure exerted on the seated occupant in the second zone;

wherein the first response is different than the second response; and
wherein:
the first zone is made of a first material;
the second zone is made of a second material; and
the first material is different than the second material.

2. The seat assembly of claim 1, wherein:
the first response includes at least one of a stiffness response, an energy dissipation response, and a thermal response; and
the second response includes at least one of a stiffness response, an energy dissipation response, and a thermal response.

3. The seat assembly of claim 1, wherein:
the first zone is characterized by a first elastic modulus;
the second zone is characterized by a second elastic modulus; and
the first elastic modulus is different than the second elastic modulus.

4. The seat assembly of claim 1, wherein:
the first zone has a first shape which defines the first response;
the second zone has a second shape which defines the second response; and
the first shape is different than the second shape.

5. The seat assembly of claim 4, the suspension member further comprising:
first and second lateral portions;
a medial portion disposed between the first and second lateral portions;
wherein the first zone includes the medial portion; and
wherein the second zone includes the first and second lateral portions.

6. The seat assembly of claim 5, wherein the suspension member is made of a homogeneous material.

7. The seat assembly of claim 5, wherein:
the medial portion is characterized by a first elastic modulus;
the first response provided by the first zone includes a stiffness response defined by the first elastic modulus;
the first and second lateral portions are characterized by a second elastic modulus;
the second response provided by the second zone includes a stiffness response defined by the second elastic modulus; and
the first elastic modulus is greater than the second elastic modulus.

8. The seat assembly of claim 7, wherein:
the first zone is made of a first material;
the second zone is made of a second material; and
wherein the first material is different than the second material.

9. The seat assembly of claim 1, the suspension member further comprising:
a first surface and a second surface defined by the suspension member;
at least one aperture formed in one of the first and the second zones;
wherein the at least one aperture extends through the suspension member from the first surface to the second surface; and
wherein a response of the one of the first and the second zones is defined by the at least one aperture.

10. The seat assembly of claim 1, the suspension member further comprising:
a third zone configured to provide a third response to the occupant load; and
at least one aperture formed in the third zone;
wherein the third response is a third contact pressure exerted on the seated occupant in the third zone.

11. The seat assembly of claim 1, wherein:
one of the first and second zones includes textile having at least one of a woven structure, a knitted structure, and a crocheted structure; and
an other of the first and second zones is formed of a non-textile material.

12. The seat assembly of claim 1, wherein:
the suspension member includes a textile material; and
the textile material includes at least one of a woven structure, a knitted structure, and a crocheted structure.

13. The seat assembly of claim 1, the suspension member further comprising:
a first textile structure forming the first zone;
wherein the first textile structure includes at least one of a woven structure, a knitted structure, and a crocheted structure;
a second textile structure forming the second zone;
wherein the second textile structure includes at least one of a woven structure, a knitted structure, and a crocheted structure; and
wherein the first textile structure is different than the second textile structure.

14. The seat assembly of claim 13, wherein the first textile structure is different than the second textile structure in at least one of a stitch type, a stitch pattern, a yarn type, a yarn denier, a needle size, a fiber type, a fiber size, a stitch density, a warp pattern, a weft pattern, and a weave type.

15. A seat assembly for seating an occupant, wherein the seated occupant exerts an occupant load on the seat assembly, the seat assembly comprising:
a cushion;
a frame; and
a suspension member;
wherein the suspension member is positioned intermediate the cushion and the frame;
wherein the suspension member comprises:
a first surface and a second surface defined by the suspension member;
a first zone configured to provide a first response to the occupant load;
wherein the first zone is characterized by a first elastic modulus;
a second zone configured to provide a second response to the occupant load;
wherein the second zone is characterized by a second elastic modulus;
wherein the first elastic modulus is different than the second elastic modulus;
wherein the first response includes at least one of a stiffness response and an energy dissipation response;
wherein the second response includes at least one of a stiffness response and an energy dissipation response;
at least one aperture formed in one of the first and the second zones;
wherein the at least one aperture extends through the suspension member from the first surface to the second surface; and
wherein the first response is different than the second response.

16. The seat assembly of claim 15, wherein:
the suspension member is made of a textile material; and the textile material includes at least one of a woven structure, a knitted structure, and a crocheted structure.

17. The seat assembly of claim 16, the suspension member further comprising:
a third zone configured to provide a third response to the occupant load;
wherein the third zone includes a plurality of apertures;
wherein the third response is a third contact pressure exerted on the seated occupant in the third zone.

18. The seat assembly of claim 15, wherein:
the seat assembly is part of a vehicle.

19. A seat assembly for seating an occupant, wherein the seated occupant exerts an occupant load on the seat assembly, the seat assembly comprising:
a cushion;
a frame; and
a suspension member;
wherein the suspension member is positioned intermediate the cushion and the frame;
wherein the suspension member comprises:
a first zone configured to provide a first response to the occupant load;
wherein the first zone is made of a first textile material including at least one of a knitted structure and a crocheted structure;
wherein the first response is defined by the at least one of the knitted structure and the crocheted structure of the first textile;
a second zone configured to provide a second response to the occupant load;
wherein the second zone is made of a second textile material including at least one of a knitted structure and a crocheted structure;
wherein the second response is defined by the at least one of the knitted structure and the crocheted structure of the second textile; and
wherein the first response is different than the second response.

* * * * *